United States Patent [19]

Gignac et al.

[11] Patent Number: 5,248,183
[45] Date of Patent: Sep. 28, 1993

[54] SWING OUT ARMREST CUPHOLDER

[75] Inventors: Christopher Gignac, Sylvan Lake; Robert Juzwiak, Livonia, both of Mich.

[73] Assignee: Davidson Textron Inc., Dover, N.H.
[21] Appl. No.: 960,540
[22] Filed: Oct. 13, 1992
[51] Int. Cl.$^5$ ............................................. A47C 7/62
[52] U.S. Cl. ............................ 297/194; 297/411.46; 248/311.2
[58] Field of Search ............... 297/194, 218, 227, 411, 297/414, 416, 188; 248/311.2, 118

[56] References Cited

U.S. PATENT DOCUMENTS

| | | | |
|---|---|---|---|
| 3,215,467 | 11/1965 | McFarland et al. | 297/194 |
| 4,040,659 | 8/1979 | Arnold. | |
| 4,733,908 | 3/1988 | Dykstra et al. | 297/194 |
| 4,818,017 | 4/1989 | Dykstra et al. | |
| 4,907,775 | 3/1990 | Lorence et al. | 297/194 X |
| 4,943,111 | 7/1990 | Vanderlean. | |
| 5,087,008 | 2/1992 | Miller et al. | 248/311.2 |

FOREIGN PATENT DOCUMENTS 467338  6/1937 United Kingdom .............. 297/194

Primary Examiner—Laurie K. Cranmer
Attorney, Agent, or Firm—Reising, Ethington, Barnard, Perry & Milton

[57] ABSTRACT

A swing out container holder is provided as part of a vehicle armrest or console. The armrest includes a front side forming the front part of the armrest in the closed position and forming a support shell of the container holder in the open position. The front side swings open about a lower surface hinge to expose the container holder. A second container holder is automatically slid out from within the armrest upon opening movement of the first container holder.

10 Claims, 1 Drawing Sheet

SWING OUT ARMREST CUPHOLDER

TECHNICAL FIELD

The invention relates to container holders for vehicles, and more particularly toward an armrest or console containing such container holders.

BACKGROUND OF THE INVENTION

There are a variety of cupholders or container holders utilized for supporting cups, cans or other beverage containers in vehicles which are selectively accessible to the vehicle passengers or occupants. Many of these container holders have been stored in armrest assemblies in the vehicles. Examples of such holders include U.S. Pat. No. 4,943,111, issued Jul. 24, 1990 in the name of VanderLaan and U.S. Pat. No. 4,818,017, issued Apr. 4, 1989 in the name of Dykstra et al. Both patents relate to cupholders which are stored in armrests in the vehicle. A full lid or cover on the armrest is raised and a cupholder mechanism is removed from internal the armrest and secured outwardly of the armrest. The lid of the armrest may be closed with the cupholder extending from the armrest. The problem with these types of holders is the difficulty of accessing the holder, i.e., the user must maneuver several components to properly position the cupholder to receive a cup or container.

U.S. Pat. No. 4,040,659, issued Aug. 9, 1977 in the name of Arnold discloses a food tray and a cupholder combination for automobiles which slides out from within the armrest and from the front face thereof. The problem with this holder is that it requires substantial lateral space in front of armrest for extension and full deployment of a pair of cupholders and trays.

SUMMARY OF THE INVENTION

The invention is an assembly for supporting containers of the passenger in a vehicle. The assembly can be either an armrest assembly or a console assembly. The assembly can be either center or side mounted with respect to passengers, or it can be an installation within an instrument panel. The assembly comprises housing means for mounting to a vehicle and having an upper surface for supporting an arm of the passenger, a lower surface for placement adjacent a vehicle seat, side surfaces and a front surface interconnected to the upper, lower and side surfaces. The housing means includes storage means having a container holder therein pivotal between a closed position preventing access to the container holder and an open position allowing access to the container holder. The storage means includes a support shell for supporting the container and container holder in the open position with the support shell extending from the lower surface allowing access to the container holder, and pivotal to a closed position in which it forms the front surface of the assembly. The assembly can be either an armrest or a console unit.

The invention also includes a first container holder operatively connected to the housing means for pivotal movement outwardly from the housing means from a cavity therein into an open position and pivotally retractable within the cavity when in its closed position, and a second container holder operatively connected to the first container holder for automatic axial movement into the cavity to a position aligned with an opening through the upper surface when the first container is in its open position and wherein the second container is axially moveable from the cavity to an internal space within the housing means as the first container is pivoted into the cavity thereby to prevent access to both container holders when in the closed position.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
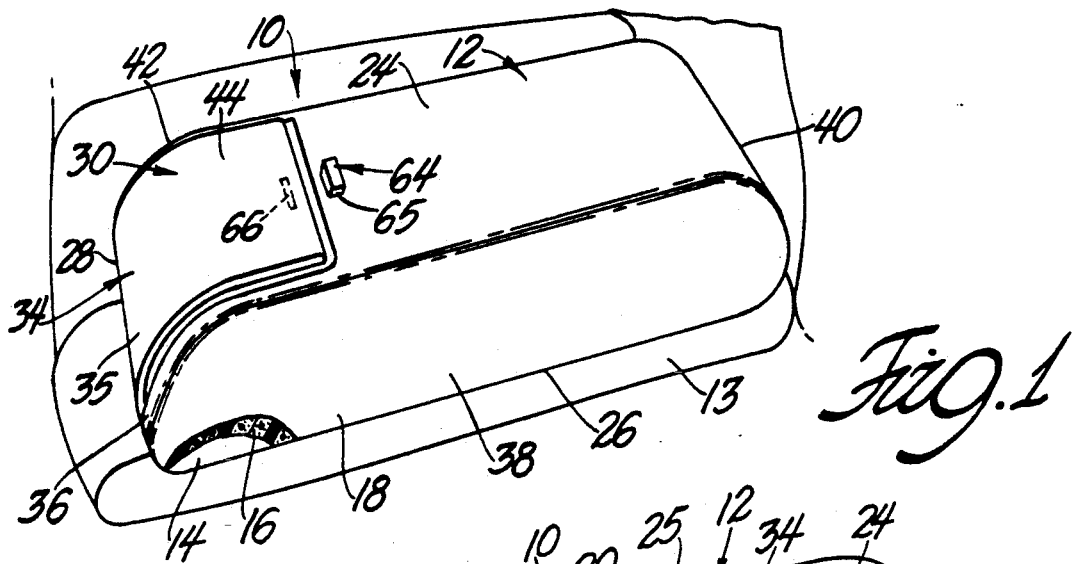
FIG. 1 is a partially cut away perspective view of the subject invention in the closed position and disposed downwardly on the seat of a motor vehicle.
Figure 2:
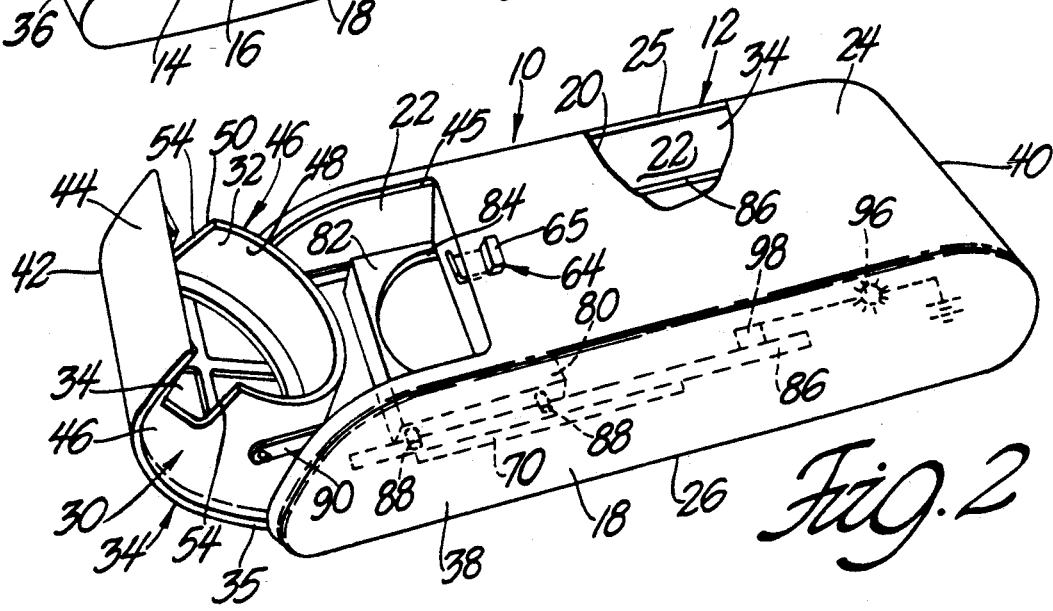
FIG. 2 is a partially cut away perspective view of subject invention in a partially open position.
Figure 3:
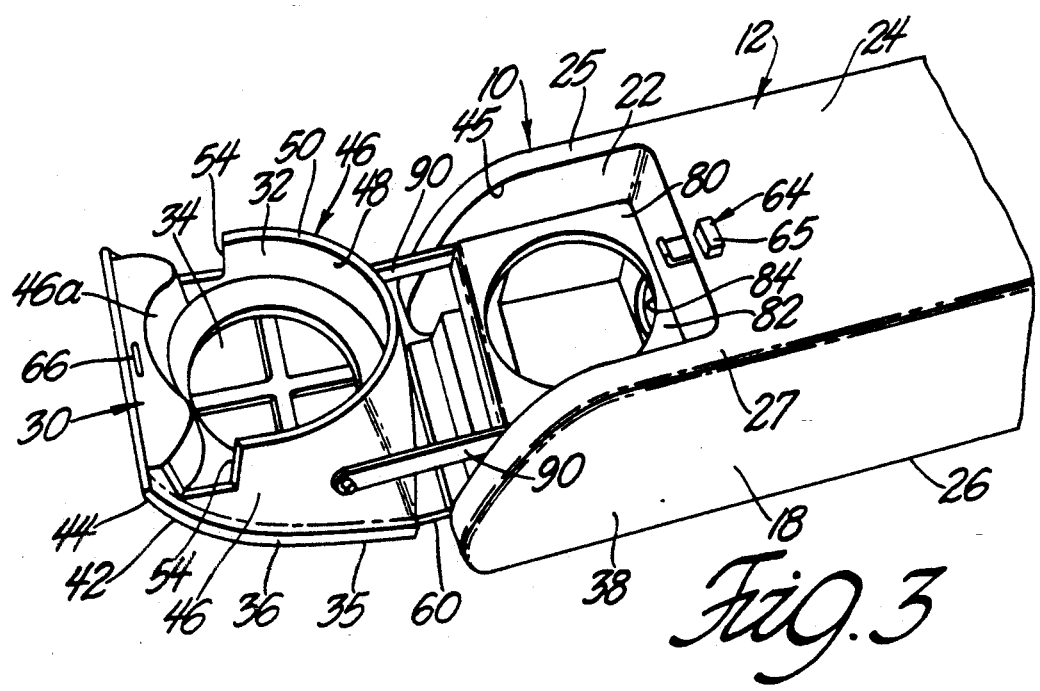
FIG. 3 is a partially cut away perspective view of the subject invention in a fully open position.

An assembly for supporting containers of a passenger in a vehicle is generally illustrated at 10 in FIGS. 1-3. The assembly 10 generally comprises housing means 12 forming an armrest or console which is secured to a vehicle for use by the passengers thereof. The illustrative embodiment of the subject invention shown in the Figures is of an armrest, though it is to be understood that the invention may be utilized in a console, instrument panel, etc.

The housing means 12 includes a rigid plastic interior retainer 14 of a high strength plastic such as ABS. The retainer 14 has a foam-in-place covering layer 16 molded thereto. A suitable material is a polyurethane foam composition though other foam materials or soft padding is equally suitable for use with the present invention. A cover material 18 covers the foam 16 for aesthetics and wear properties. The plastic retainer 14 is configured in a generally rectangular form having a hollow cavity 20 and interior space 22. The housing means 12 may be formed by commonly known molding principles and while it is shown as a composite plastic construction other housing means, including injection molded thermoplastic materials or metal fabricated housing can be used.

The housing means 12 includes an upper, flat surface 24 for supporting the arm of the passenger, side surfaces 25, 27 and a lower, flat surface 26 for placement adjacent the vehicle, i.e., resting on the seats 13 of the vehicle. A front surface 28 interconnects the upper surface 24 with the lower surface 26. The assembly 10 may be fixedly secured to vehicle seats 13 as an armrest assembly, or it may be part of a console or it can be part of an instrument panel housing all as commonly known in the art.

The housing means 12 includes storage means 30 having a container holder 32 therein. The storage means 30 pivots between a closed position (FIG. 1) preventing access to the container holder 32, through a partially open position (FIG. 2), and to an open position (FIG. 3) allowing access to the container holder 32. The storage means 30 includes a support shell 34 for supporting the container and container holder 32 in the closed position, and for forming the front surface 28 and a portion of the upper surface 24 in the closed position. The storage means 30 pivots to the open position with the support shell 34 extending from the lower surface 26 allowing access to the container holder 32.

The longitudinal side walls 25, 27 and a rear 40 form the remainder of the housing means 12 between the upper and lower surfaces 24, 26.

The support shell 34 includes a base 35 comprising the front surface 28. The surface 28 has a bend 42 angling to a flange 44 forming a portion of and aligned with the upper surface 24. In the closed position, the upper surface 24 of the assembly 10 continues along the flange 44, and angles around the bend 42 to the base 35 of the front face side 36. The base 35 is pivotally connected to the lower surface 26 of the housing means 12. In the open position, the flange 44 is spaced above and forward of an opening 45 into the cavity 20 through the upper surface 24.

The container holder 32 includes a rigid plastic molded retainer 46 which is molded with the base 35, bend 42, and flange 44. The plastic retainer 46 includes a retainer cavity 48 formed by a cylindrical support walls 50 extending from the base 35 toward the housing cavity 20 in the closed position. The retainer cavity 48 has a bottom surface at the base 35. The retainer 46 on the inner surface of the upper flange 44 is shaped at 46a to form a portion of the cylindrical support walls 50. The cylindrical support walls 50 include a pair of notches 54 longitudinally therethrough on opposite sides across the cavity 48 to allow clearance for handles of a container to extend through.

The support shell 34 is connected to the remainder of the housing means 12 between the base 35 and the lower surface 26 by a hinge 60. The hinge 60 allows the storage means 30 to pivot to the closed position and to the open position while maintaining and supporting same in a horizontal position with the lower surface 26. The hinge 60 may be of the type commonly known in the art, i.e., used for glove compartments.

Latch means 64 is operatively connected between the storage means 30 and the remainder of the housing means 12. The latch means 64 may be of the releasible latch type that releases upon depression. Alternatively, the latch means 64 can be a manual lifting type of door tab, i.e., a magnetic latch. The latch means 64 includes an actuating member 65 secured to the upper surface 24 adjacent the opening 45. The actuating member 65 engages a notch 66 in the inner surface of the flange 44 to maintain same in the closed position. Depression of the actuating member 65 disengages it from the notch 66 allowing the storage means 30 to open.

The storage means 30 also includes pivot control means 70 for biasing the storage means 30 in the open position whereby upon release of the latch means 64, the storage means 30 pivots from the closed position to the open position. The control means 70 includes a spring loaded and dampened tracking mechanism for controlling movement of the pivoting motion. The mechanism 70 is of the type parallel link tracking mechanism.

The assembly 10 also contains a second container holder 80 slideably retained within the interior 22 of the housing 12 inboard of the cavity 20. The container holder 80 is pulled into alignment with cavity 22 for providing access to the second container holder 80 upon opening of the storage means 30. The second container holder 80 comprises a rigid plastic molded member 82 of a generally rectangular, plate shape, with a cylindrical opening 84 formed therein to receive a beverage container. A pair of tabs 88 extend outwardly from opposing sides of the member 82 for engaging an inner surface groove or track 86 in the inner surface 38 of side walls 25, 27 of the housing 12. The pair of opposing longitudinal grooves or tracks 86 receive the tabs 88 for slideably guiding the member 82 therein.

The assembly 10 includes drive means 90 operatively connecting between the first container holder 32 and the second container holder 80 for sliding the second container holder 80 outwardly and providing access thereto upon pivotal movement of the storage means 30 to the open position. The drive means 90 comprises a pair of parallel linkage arms 90 pivotally connected between the sides of the container holders 32, 80, e.g., the arms 92 each extend between the holders 32, 80. Therefore, the linkage arms 90 will retain the holders 32, 80 at a predetermined spacing. When the storage means 30 is in the closed position, the second container holder 80 is located fully within the hollow housing means 12 and the first container holder 32 is pivoted on a side or vertical position. Upon opening of the storage means 30, the base portion 34 will pivot outwardly thereby pivoting the first container holder 32 to the horizontal position allowing access thereto. Upon this movement, the linkage means 90 slide the second container holder 80 outwardly exposing the container cavity 84 in the opening 45 provided by the opened storage means 30. During closing, pivotal movement of the storage means 30 will cause the arms 90 to push the second holder 80 into the cavity 22.

Optionally, the assembly 10 may include illumination means 96 (FIG. 2), generally a soft glow light, connected within the cavity 20 and interior space 22 for illuminating the holders 32, 80 when in the open position. A contact switch 98 connected between the second holder 80 and the housing 12 senses opening of the storage means 30 to cause power and illumination of the light 96, and to discontinue power and illumination thereof in the closed position. The switch 98 interconnects a power line from the vehicle battery to the light 96.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. An assembly for supporting containers of the passenger in a vehicle, said assembly comprising:

housing means including a front side and a lower surface for mounting to a vehicle;

said housing means including storage means having a first container holder therein of a predefined shape for pivoting between a closed position within said housing means preventing access to said container holder and an open position outwardly of said housing means allowing access to said container holder while maintaining said first container holder in said predefined shape when in said open and closed positions and during movement therebetween;

said storage means including a support shell for supporting the container and said container holder in its open position and for forming a portion of said front side when said first container holder is in said closed position, said support shell fixedly connected to said first container holder for moving said container holder between said open and closed positions with said first container holder maintained in said predefined shape; and means for pivotally connecting said support shell to said lower surface for providing swinging movement of said support shell between said open and closed positions for allowing access to said container holder.

2. An assembly as set forth in claim 1 wherein said housing means includes an interior space therein, and the assembly further includes a second container holder disposed in said interior space of said housing means and automatically slideably extendable in response to said first container holder moving to said open position for supporting an additional container.

3. An assembly as set forth in claim 2, said housing means including an upper surface for defining an armrest; said support shell including an exterior surface having a bend therein forming a connection between said upper surface and said front side.

4. An assembly as set forth in claim 2 further including linkage arms interconnecting said first and second container holders for sliding said second container holder in response to said first container holder moving between said open and closed positions.

5. An assembly as set forth in claim 1 wherein said container holder includes fixed support walls extending from a base forming a cavity comprising said predefined shape to receive a container therein for maintaining said predefined shape and relation between said support walls and said base in said open and closed positions and during movement therebetween.

6. An assembly as set forth in claim 5 wherein said container holder includes unitary molded support walls and a base fixedly connected to said support shell.

7. An assembly for supporting containers of the passenger in a vehicle, said assembly comprising:
housing means for mounting to a vehicle and having an upper surface for supporting an arm of the passenger, a lower surface for placement adjacent the vehicle, a front side interconnecting said surfaces, and a cavity therein;
said housing means including storage means connected to a portion of said front side of said housing means and forming a portion of said upper surface for moving between an open position providing a horizontal opening to said cavity through said upper surface and for moving to a closed position preventing access to said cavity;
said storage means including a first container holder operatively connected to said housing means for extending outwardly from said housing means and out of said cavity in said open position and extending within said cavity in said closed position, and a second container holder operatively connected to said first container holder for automatically moving within said cavity to a position vertically aligned with said horizontal opening supported by and within said housing means when in said open position and for moving further into said cavity preventing access thereto when in said closed position.

8. An assembly as set forth in claim 7 further including linkage arms interconnecting said first and second container holders for sliding said second container holder in response to said first container holder moving between said open and closed positions.

9. An assembly as set forth in claim 8 further including said storage means including a base for supporting the container and said container holder in the open position and for forming a portion of said front side in said closed position, and for pivoting to said open position with said base portion extending from said lower surface allowing access to said container holder.

10. An assembly as set forth in claim 5 wherein said storage means forms a vertical opening to said cavity through said front side for allowing said first container holder to extend horizontally outwardly from said vertical opening when said storage means is in said open position.

* * * * *